(12) United States Patent
Arriens, Jr. et al.

(10) Patent No.: US 8,297,590 B2
(45) Date of Patent: Oct. 30, 2012

(54) GUIDED NON-PORTED EXPANDING GATE VALVE AND METHOD

(75) Inventors: Frank J. Arriens, Jr., Houston, TX (US); William L. Godare, Panorama Village, TX (US)

(73) Assignee: T-3 Property Holdings, Inc., Houston, TX (US)

( * ) Notice: Subject to any disclaimer, the term of this patent is extended or adjusted under 35 U.S.C. 154(b) by 398 days.

(21) Appl. No.: 12/701,258

(22) Filed: Feb. 5, 2010

(65) Prior Publication Data

US 2010/0206385 A1 Aug. 19, 2010

Related U.S. Application Data

(60) Provisional application No. 61/153,930, filed on Feb. 19, 2009.

(51) Int. Cl.
*F16K 25/00* (2006.01)

(52) U.S. Cl. ......... 251/169; 251/197; 251/201; 251/204

(58) Field of Classification Search .................. 251/167, 251/169, 195–204, 326–329
See application file for complete search history.

(56) References Cited

U.S. PATENT DOCUMENTS

| | | | |
|---|---|---|---|
| 2,583,512 A | | 1/1952 | Laurent |
| 2,855,175 A | * | 10/1958 | Dunbar .................. 251/196 |
| 4,017,058 A | | 4/1977 | Morrison |
| 4,103,863 A | * | 8/1978 | Houlgrave et al. .......... 251/48 |
| 4,188,014 A | * | 2/1980 | Alvarez .................. 251/196 |
| 4,262,690 A | * | 4/1981 | Binegar .................. 251/330 |
| 4,334,666 A | * | 6/1982 | Alvarez et al. ............ 251/167 |
| 6,158,718 A | * | 12/2000 | Lang et al. .............. 251/167 |
| 6,164,622 A | | 12/2000 | Partridge |

* cited by examiner

*Primary Examiner* — John Bastianelli
(74) *Attorney, Agent, or Firm* — Locke Lord LLP (57) ABSTRACT

A non-ported expanding gate valve and method of use, including an expanding gate assembly and a slotted guide, is fixedly positioned on the valve body and slidably coupled with a gate assembly. The guide has slots of varying widths that are used with a pivoting rocker arm coupled with the gate assembly to adjust the thickness of the gate assembly at the proper timing. The guides perform multiple functions, including: centralizing a rocker arm during opening between seats; collapsing the gate assembly when opening; allowing and controlling expansion when closing; guiding lateral movement during operation of the gate assembly between opposing guides on the sides of a flow passageway; guiding axial movement during operation of the gate assembly between opposing guide side flanges; retaining seats in position when the valve is open; and/or stiffening the guide in a lateral direction to control movement of the gate assembly.

13 Claims, 9 Drawing Sheets

GUIDED NON-PORTED EXPANDING GATE VALVE AND METHOD

CROSS REFERENCE TO RELATED APPLICATIONS

This application claims the benefit of U.S. Provisional Application No. 61/153,930, filed Feb. 19, 2009, and is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The disclosure generally relates gate valves. More particularly, the disclosure relates to the expanding gate valves.

2. Description of the Related Art

A type of gate valve known as a "through-conduit" gate valve provides a full bore, unbroken passageway when the valve is fully open. To seal the valve, a gate assembly moves transverse to the flow passageway to open and close flow through the passageway by sealing against seats surrounding the passageway disposed generally upstream and downstream of the gate assembly. A gate assembly for a through-conduit valve typically is an elongated assembly having a flow opening ("port") in a lower portion and no port in an upper portion. To open the valve, the gate assembly is raised into an upper housing of the valve body to align the port in the lower portion of the gate assembly with the flow passageway through the valve body to allow flow. To close the valve, the gate assembly is lowered into a cavity below the flow passageway to align the upper portion without the port with the flow passageway.

To allow the gate assembly movement, a clearance between seats and the gate assembly is useful during movement, but detrimental in a closed position to effect a seal. To accommodate the change in clearance, an expanding gate assembly has been used in the industry. A gate of the gate assembly is coupled with a segment of the gate assembly that interfaces with the gate typically along a tapered surface. The gate assembly can expand in overall thickness in the closed position to fill the clearance to seal against the seats, but collapse in overall thickness when opening to allow the gate assembly to move. Through-conduit gate valves rely on the gate assembly to retain the seats in position. Through-conduit gate valves can also rely on seat plates to retain the seats in position.

The WKM Powr-R-Seal valve, illustrated in U.S. Pat. No. 2,583,512, is an example of a through-conduit gate valve with seats, seat plates, and an expanding gate assembly. Using the nomenclature and element numbers from such patent, the gate assembly, having a gate 25 and a segment 26, slides between seats 14, 15 and seat plates 17, 18 with side flanges 19, 20 that extend below the flow passageway, so that the gate assembly is supported in a closed position and an open position. The seat plates extend transverse to the flow passageway and can be integral to the seats against which the gate assembly seals across the flow passageway.

Such a configuration is not acceptable in a non-ported gate valve. There is no cavity below the flow passageway in which to lower a gate assembly with the port. Thus, a gate assembly in a non-ported gate valve does not have the lower portion with the port.

Figure 1A:
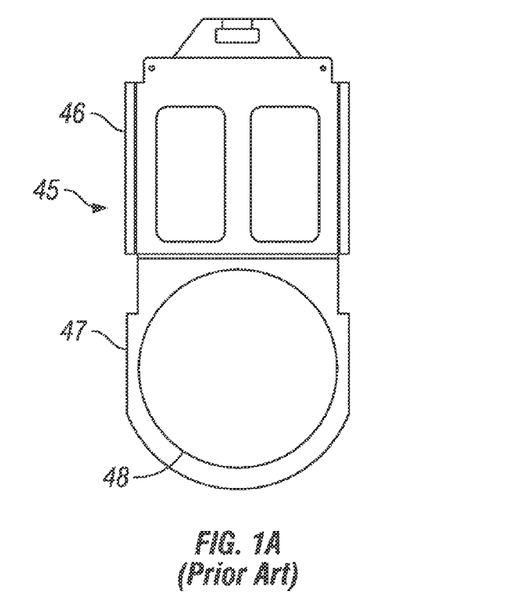
FIG. 1A is an exemplary prior art side view schematic of a through-conduit gate valve portion.
Figure 1B:
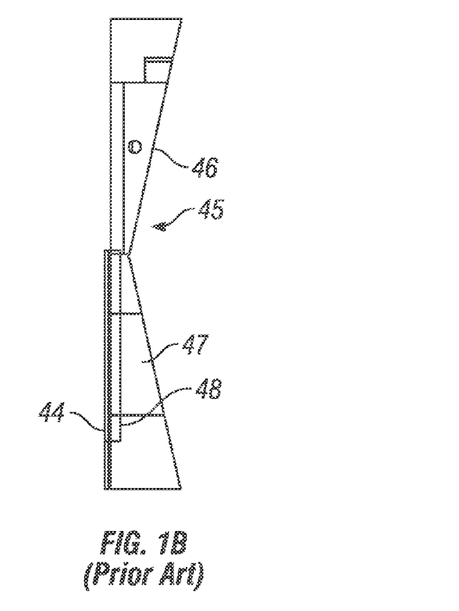
FIG. 1B is an exemplary prior art front view schematic of the through-conduit gate valve portion of FIG. 1A.
Figure 2A:
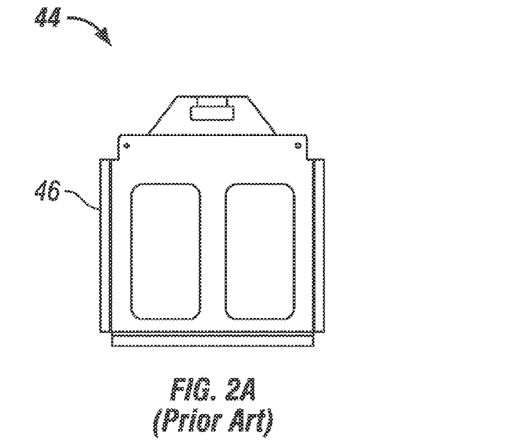
FIG. 2A is an exemplary prior art side view schematic of a non-ported gate valve portion.
Figure 2B:
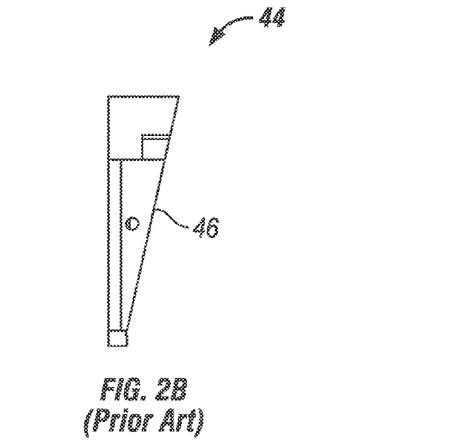
FIG. 2B is an exemplary prior art front view schematic of the non-ported gate valve portion of FIG. 1A.

FIG. 1A is an exemplary prior art side view schematic of a through-conduit gate valve portion. FIG. 1B is an exemplary prior art front view schematic of the through-conduit gate valve portion of FIG. 1A. FIG. 2A is an exemplary prior art side view schematic of a non-ported gate valve portion. FIG. 2B is an exemplary prior art front view schematic of the non-ported gate valve portion of FIG. 2A. The figures will be described in conjunction with each other. Referring to FIGS. 1A and 1B, a through-conduit gate valve portion 45 includes an upper portion 46 and a lower portion 47. The upper portion 46 is blocked without a port and the lower portion 47 includes a port 48. In contrast, referring to FIGS. 2A and 2B, a non-ported gate valve portion 44 includes an upper portion 46 without the lower portion 47 or the port 48, significantly shortening the gate assembly. A guide 49 shown in FIG. 1A that would typically be positioned in a lower cavity of a through-conduit valve is not available for a non-ported valve because the non-ported valve does not have a sufficiently long lower cavity. Further, the guide 49 for the through-conduit gate valve portion would not adequately support the shorter non-ported gate valve portion 44 for a non-ported gate valve when in the raised open position. Simply extending the guide 49 upward in the orientation shown is problematic due to mechanical stops employed in the valve function.

A further complication can be evidenced from comparing the FIGS. 1A-1B to FIGS. 2A-2B. In a through-conduit valve using the through-conduit gate valve portion 45, either the upper portion 46 or the lower portion 47 would support the seats in position around a valve flow passageway disposed in the valve body depending on whether the valve is closed or open. However, for the non-ported valve, using the non-ported gate valve portion 44 without a lower portion, the seats will be unsupported when the upper portion is moved upward and the valve is open, a time when the support is much needed. To restrain the seats in position for a non-ported gate valve, U.S. Pat. No. 4,017,058 supplies retainers with hook portions that hooks into a specially formed groove.

An example of a compact expanding gate valve is shown in U.S. Pat. No. 6,164,622. As illustrated in the figures and described in the Abstract of that patent, the compact expanding gate valve 10 has a valve body 12 defining a flowway 18, 20 and having spaced internal seat rings 72, 74. Guide elements (pins 106, 108 in FIGS. 1-4 or rib-like guide element 111 in FIG. 5) are fixed in position to the valve body and project internally from the valve body. A valve stem driven gate and segment assembly 80 is movable within the valve body between open and closed positions relative to the seat rings and has control arms 116 mounted by actuating pins 112, 114 to each side of gate member 82 and segment 90 of the gate and segment assembly. The control arms 116 each have an arm section 118 separated from an opposing arm section 120 by a guide slot 122. The guide slot 122 enlarges at a top portion of the control arm into a slot enlargement 128. The control arms 116 are not fixed but rather are movable linearly with the gate and segment assembly 80 and are disposed in guided relation with the fixed guide elements 106, 108 (or 111) during opening and closing movement. During initial movement of the gate and segment assembly 80 from the closed position, the pinned connection of the control arms 116 to the gate member 82 and the segment member 90 causes the control arms to pivot responsive to relative linear movement of the gate and segment members and apply collapsing force to the gate and segment members to collapse the gate and segment assembly to minimize frictional contact thereof with the seat rings and permit its movement by the valve stem from the closed position to the open position. However, among other aspects, the configuration of the guide elements 106, 108 (or 111) do not show any contact with the seat rings 72, 74 to hold the seat rings in position when the gate assembly 80 is upward and the valve is open.

Thus, there remains a need for providing a design for a non-ported gate valve that employs an expanding gate assembly.

BRIEF SUMMARY OF THE INVENTION

The disclosure provides a non-ported expanding gate valve and method of use, including an expanding gate assembly and a slotted guide, fixedly positioned on the valve body and slidably coupled with a gate assembly. The guide has slots of varying widths that are used with a pivoting rocker arm coupled with the gate assembly to expand and collapse the thickness of the gate assembly at the proper timing. The guides perform multiple functions, including: centralizing a rocker arm during opening between seats; collapsing the gate assembly when opening; allowing and controlling expansion when closing; guiding a lateral movement during opening and closing of the gate assembly between opposing guides on the sides of a flow passageway; guiding an axial movement during opening and closing of the gate assembly between opposing guide side flanges; retaining seats in position when the valve is in an open position; and/or stiffening the guide in a lateral direction to control side to side movement of the gate assembly within the valve body.

The disclosure provides an expanding gate valve, comprising: a valve body having a valve cavity forming a flow passageway with a flow passageway axis; a gate assembly coupled to the valve body traverse to the flow passageway, the gate assembly adapted to expand in thickness in a closed position to seal the valve relative to a thickness of the gate assembly in an at least partially open position; and a slotted guide fixedly positioned on the valve body, slidably coupled with the gate assembly, disposed laterally to the gate assembly, and adapted to guide the gate assembly as the gate assembly traverses across the flow passageway as the valve closes and opens. The gate assembly comprises: a gate; a segment slidably coupled to the gate; and a rocker arm pivotally coupled to the gate and the segment. The guide comprises: a guide slot having a first width; and an opened guide slot having a second width greater than the first width, the opened guide slot being formed in the guide at a position that corresponds with a position of the gate assembly in a closed position across the flow passageway.

The disclosure also provides a method of closing and opening an expanding gate valve having a valve body with a valve cavity that forms a flow passageway with a flow passageway axis, and having an expanding gate assembly coupled to the valve body traverse to the flow passageway, the gate assembly having a gate, a segment slidably coupled to the gate, and a rocker arm being pivotally coupled to the gate and the segment, the valve further having a guide fixedly positioned with the valve body and disposed laterally to the gate assembly, the guide having a guide slot having a first width and an opened guide slot having a second width greater than the first width, the method comprising: when the valve is in at least a partially open condition, moving the gate assembly with the rocker arm transversely into the valve cavity while the rocker arm moves along the fixedly-positioned guide slot so that a relative position between the gate and segment are maintained; moving the gate assembly so that the rocker arm engages the opened guide slot; stopping the segment from further transverse movement; continuing to move the gate transversely across the valve cavity to close the valve; and changing a relative position between the gate and the segment and a position of the rocker arm in the opened guide slot along the flow passageway axis to allow a thickness of the gate assembly to expand into sealing contact with a seat disposed in the valve.

DETAILED DESCRIPTION

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Where appropriate, some elements have been labeled with an "a" or "b" to designate one side of the system or another. When referring generally to such elements, the number without the letter is used. Further, such designations do not limit the number of elements that can be used for that function.

The disclosure provides a non-ported expanding gate valve and method of use, including an expanding gate assembly and a slotted guide, fixedly positioned on the valve body and slidably coupled with a gate assembly. The guide has slots of varying widths that are used with a pivoting rocker arm coupled with the gate assembly to expand and collapse the thickness of the gate assembly at the proper timing. The guides perform multiple functions, including: centralizing a rocker arm during opening between seats; collapsing the gate assembly when opening; allowing and controlling expansion when closing; guiding a lateral movement during opening and closing of the gate assembly between opposing guides on the sides of a flow passageway; guiding an axial movement during opening and closing of the gate assembly between opposing guide side flanges; retaining seats in position when the valve is in an open position; and/or stiffening the guide in a lateral direction to control side to side movement of the gate assembly within the valve body.

Figure 3A:
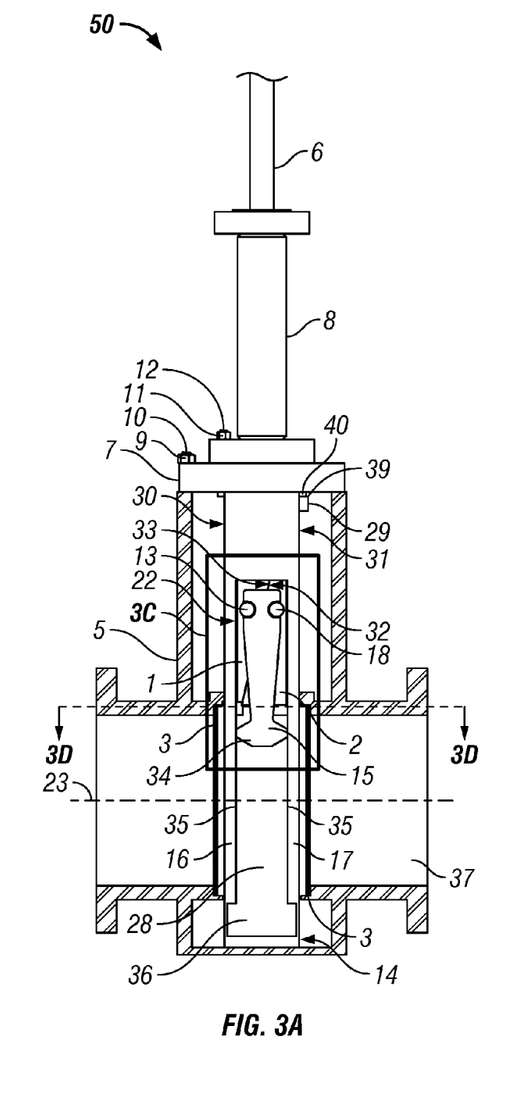
FIG. 3A is a side view, partial cross-sectional schematic of an exemplary embodiment of a non-ported gate valve in an open position having an expanding gate assembly, according to the invention.
Figure 3B:
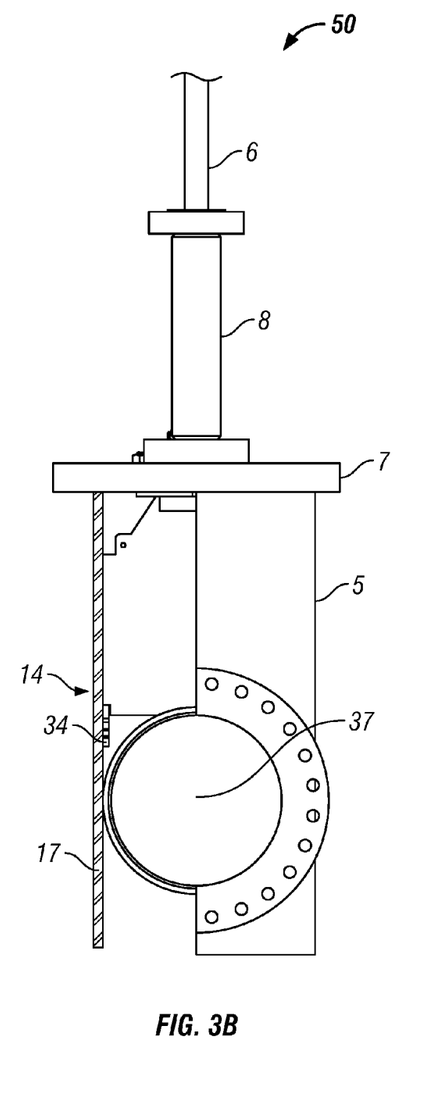
FIG. 3B is an end view, partial cross-sectional schematic of the exemplary valve of FIG. 3A.
Figure 3C:
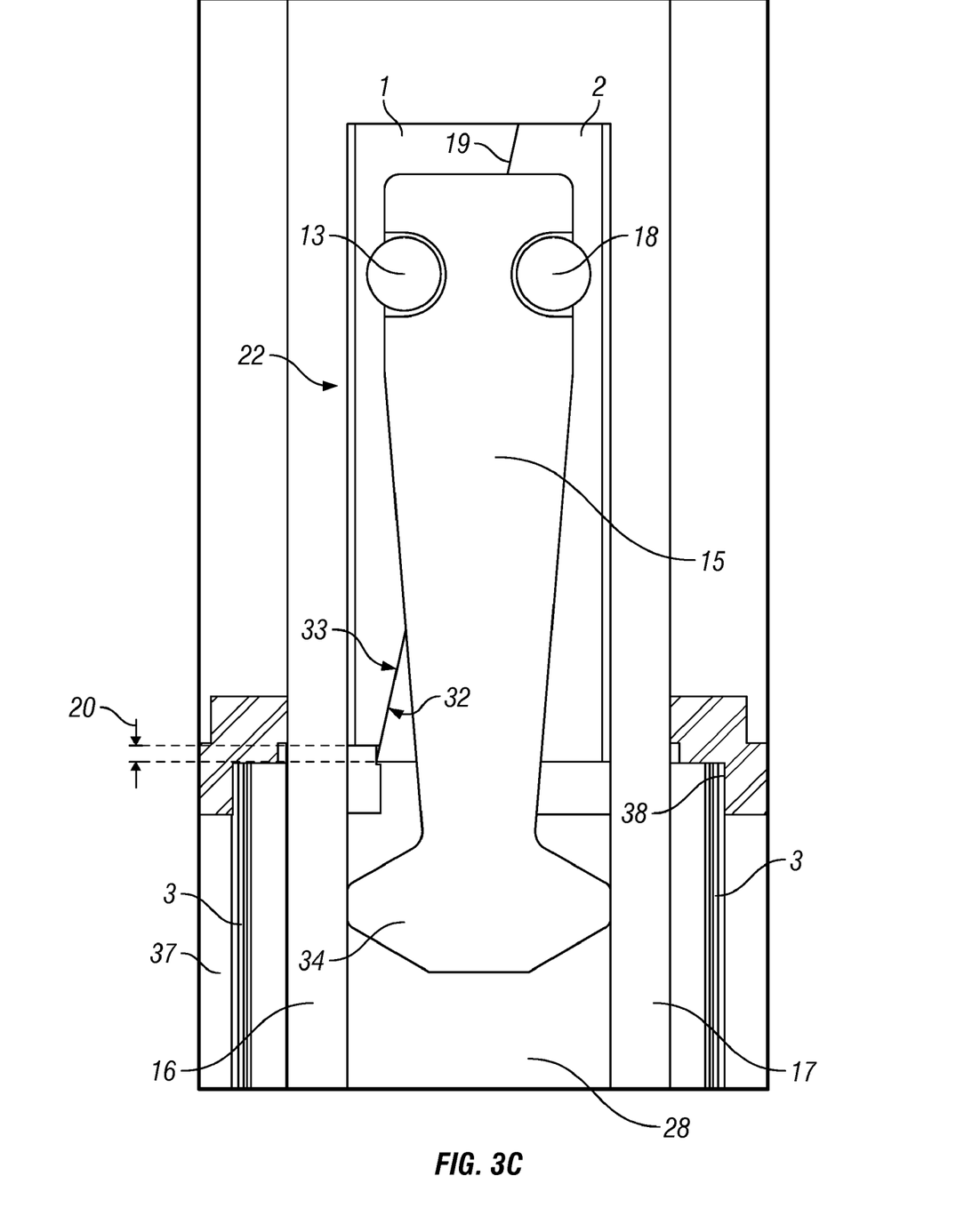
FIG. 3C is a detailed side view schematic of the expanding gate assembly slidably disposed in a guide in the valve in the open position.
Figure 3D:
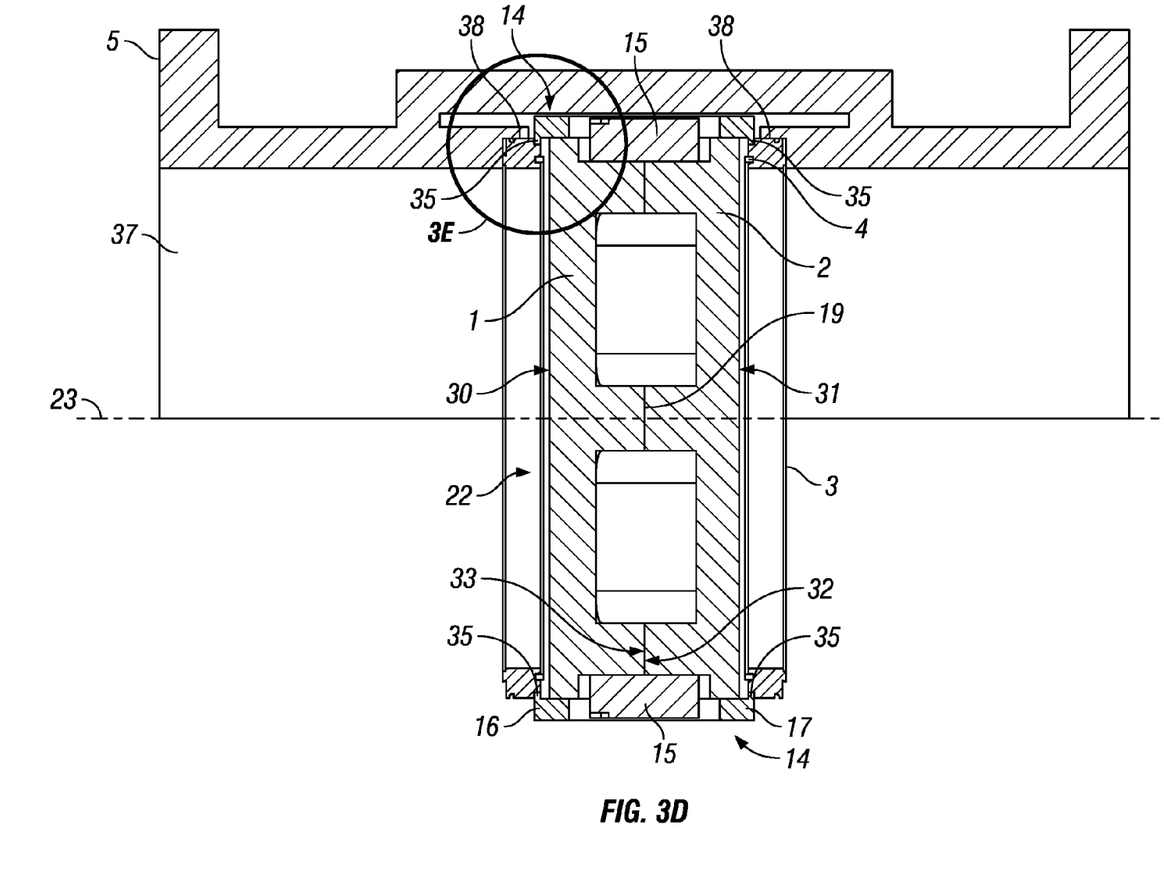
FIG. 3D is a top view, partial cross-sectional schematic of the expanding gate assembly disposed in the guide in the valve.
Figure 3E:
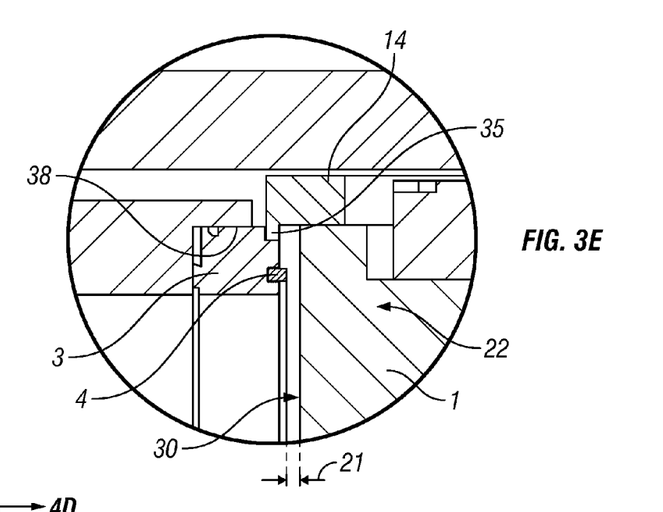
FIG. 3E is a detailed top view schematic of the expanding gate assembly relative to the guide in the valve and a seat disposed in the valve having a seat insert.
Figures 4A, 4B:
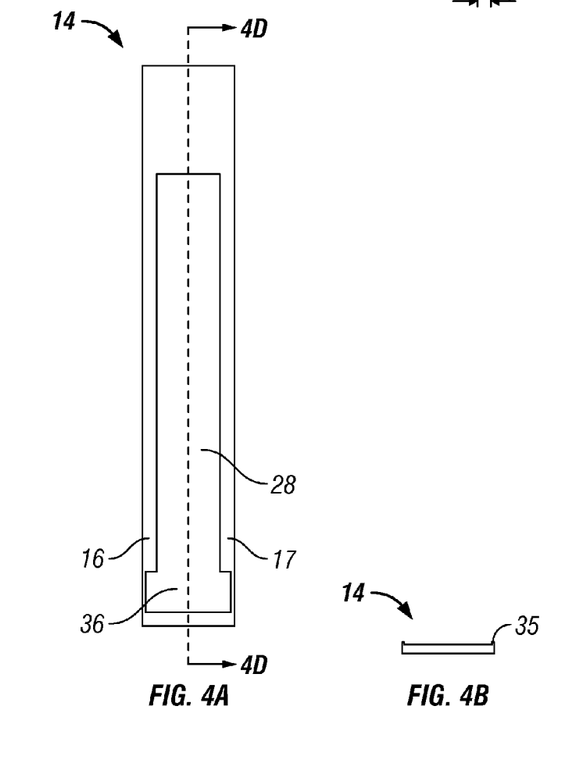
FIG. 4A is a side view schematic of an exemplary guide.
FIG. 4B is a top view schematic of the guide of FIG. 4A.
Figures 4C, 4D:
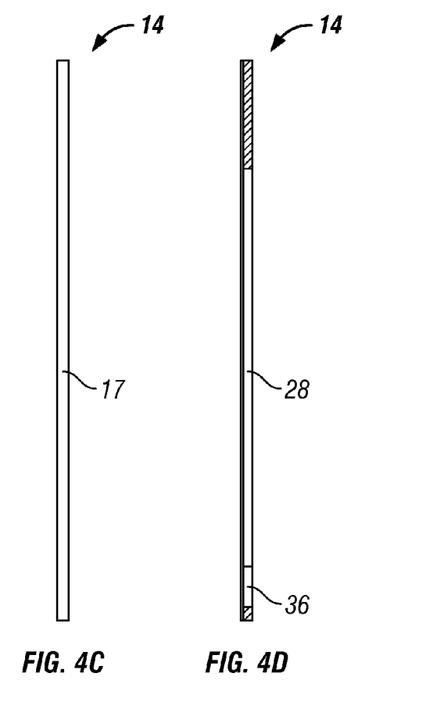
FIG. 4C is an edge view schematic of the guide.
FIG. 4D is a cross-sectional view schematic of the guide.

FIG. 3A is a side view, partial cross-sectional schematic of an exemplary embodiment of a non-ported gate valve in an open position having an expanding gate assembly, according to the invention. FIG. 3B is an end view, partial cross-sectional schematic of the exemplary valve of FIG. 3A. FIG. 3C is a detailed side view schematic of the expanding gate assembly slidably disposed in a guide in the valve in the open position. FIG. 3D is a top view, partial cross-sectional schematic of the expanding gate assembly disposed in the guide in the valve. FIG. 3E is a detailed top view schematic of the expanding gate assembly relative to the guide in the valve and a seat disposed in the valve having a seat insert. FIG. 4A is a side view schematic of an exemplary guide. FIG. 4B is a top view schematic of the guide of FIG. 4A. FIG. 4C is an edge view schematic of the guide. FIG. 4D is a cross-sectional view schematic of the guide. The figures will be described in conjunction with each other.

The gate valve 50 includes generally a valve body 5 that includes a valve cavity 37 forming a flow passageway with an axis 23. An expanding gate assembly 22 is generally disposed across the flow passageway and the flow passageway axis 23 when the valve is in a closed position. The gate assembly 22 generally includes a gate 1, a segment 2 slidably coupled to the gate, one or more guide pins 13, 18, and a rocker arm 15 pivotally coupled to the gate and segment by the guide pins, as detailed herein. One or more seats 3 (and generally a pair of seats for both faces of the gate assembly) are disposed in one or more seat pockets 38 in the valve cavity 37 around the flow passageway. One or more seat inserts 4, coupled to the seats 3 and more particularly shown in FIGS. 3D, 3E, can be used to seal against a face 30 of the gate 1 and a face 31 of the segment 2 disposed on an opposite surface from the face 30 of the gate 1 when the gate valve is closed. The expanding gate assembly 22, particularly the gate 1, is coupled to the stem 6 that is coupled to an actuator (not shown) that raises and lowers (in the orientations shown in FIG. 3A) the gate assembly in a transverse direction, that is, at an angle to the flow passageway axis 23 and the flow passageway in the valve cavity 37.

A bonnet 7 is coupled to the valve body 5 to support the various components above the gate valve assembly such as a yoke 8 that in turn supports the stem 6. The bonnet 7 can be coupled to the valve body 5 with a nut 9 coupled to a stud 10 that is threaded into the valve body. Similarly, the yoke 8 can be coupled to the bonnet 7 with a nut 11 coupled to a stud 12 threaded into the bonnet. Other fasteners can be used and the above examples are nonlimiting. The upward movement of the gate assembly 22 is limited by a gate stop 29 when an upper surface 39 of the gate stop encounters a bonnet stop 40.

A guide 14 is fixedly positioned and coupled with the valve body 5, so that the guide remains in fixed position as the gate assembly 22 slides up and down in the illustrated orientations. The guide 14 includes a guide first side 16 separated from a guide second side 17 by a guide slot 28. The combination of the first side 16, second side 17, and guide slot 28 is generally aligned along a direction of the flow passageway axis 23, as shown in FIG. 3A. The guide 14 is positioned laterally, that is to the side, of the gate assembly 22, as shown in FIG. 3B. The guide 14 can assist in maintaining the seat 3 in position as the gate assembly 22 opens and closes even the non-ported valve 50 with no substantial lower cavity compared to a through-conduit valve by one or more side flanges 35 of the guide 14 being fixedly positioned in close proximity to the seats 3 on each face of the gate assembly. Generally, each side of the gate assembly 22 interfaces with and is slidably engageable, that is, slidably coupled, with a guide 14, where each guide is fixedly positioned with the valve 50, so that lateral movement from side to side of the gate assembly is constrained during transverse movement of the gate assembly in opening and closing the valve. Generally, the guides 14 are disposed in the valve body 5 laterally outside of the flow passageway in the valve cavity 37 to not restrict flow. The guide 14 further includes an opened guide slot 36 that is wider in dimension than the guide slot 28. The opened guide slot 36 is generally positioned along the guide 14 coupled to the valve body 5 to interface with the rocker arm 15 coupled to the gate assembly 22, at a position where the gate assembly would be expanded to seal against the seats 3 when the valve was closed.

As more particularly seen in FIG. 3C, the gate assembly 22 having the gate 1, the segment 2, the pins 13, 18, and the rocker arm 15 are disposed in an upward position, so that the gate 1 and segment 2 generally do not block the flow passageway in the valve cavity 37. The relatively longer length of the rocker arm 15 to the pins 13, 18 compared to the distance between the pins 13, 18 provides a leveraged advantage to the rocker arm. The leveraged advantage can lower a stress exerted by or on the rocker arm 15 during the expansion and contraction of the gate assembly 22 as the rocker arm moves up and down the guide slots 28, 36. The rocker arm 15, coupled to the gate assembly 22, can be disposed laterally outside of the flow passageway in the valve cavity 37. The gate 1 and the segment 2 are coupled to each other at an interface 19. The interface 19 is formed between a gate surface 32 on the gate 1 and a segment surface 33 on the segment 2. In at least one embodiment, the interface can be an inclined interface where the inclined surfaces can slide relative to each other. For example, and without limitation, the gate 1 and segment 2 can be offset by an interface offset 20 having a real value including zero. The offset changes when the gate assembly is in a closed position, shown in FIGS. 6A-6D as the gate 1 and segment 2 shift relative to each other. The relative position of the gate 1 and segment 2 along the interface 19 can allow a clearance between the seat 3 and the sealing surfaces of the gate assembly 22. Generally, the gate assembly 22 will be in a contracted state during the majority of the transverse movement of the gate assembly in the valve 50 when the valve is at least partially open.

The rocker arm 15 includes a portion herein denoted as a guide shoe 34. The guide shoe 34 is suitably dimensioned to slide in the guide slot 28 between the sides 16, 17. The guide shoe 34 thus can assist in centralizing the gate assembly 22 within the fixedly-positioned guide slot 28, as the guide shoe moves with the gate assembly to minimize contact with the seat 3 during transverse movement of the gate assembly. While not required, the orientation of a line drawn between the pins 13, 18 is aligned perpendicularly to the travel path of the gate assembly 22 along the guide slot 28.

The stem 6 pushes on the gate 1 to close the valve resulting in a wedging action between the gate surface 32 and segment surface 33 along the interface 19. In the closed position, this wedging action affects a tight seal between the gate 1, the segment 2, and the seats 3. However, when the gate assembly is in motion, this wedging action is undesirable. Undesirable effects include increased valve torque and increased wear on the seats 3. The guide 14, rocker arm 15, and guide pins 13 control the wedging action, thus controlling the expansion and contraction of the gate 1 and segment 2 of the gate assembly 22.

Referring specifically to FIGS. 3D, 3E, the valve 50 includes various recesses in which the guide 14 and the rocker arm 15 can be disposed that are laterally to the side of the valve cavity 37 and outside of the flow pathway through the cavity. The seat 3 is disposed in the seat pocket 38. Further, a seat insert 4 is shown coupled to the seat 3 and spaced a clearance 21 from the sealing face 30 of the gate 1. When the valve is in an at least partially open position, the clearance 21 can be used to reduce wear on the seat 3 and an the associate seat insert 4 as the gate assembly traverses across the valve cavity 37 and the flow passageway. Further, the guide 14 can include a side flange 35 extending inward from the guide 14 toward the flow passageway axis 23. The side flange 35 can restrain the gate assembly 22 as the gate assembly 22 traverses across the valve cavity 37. The side flange 35 can restrict the axial movement of the gate 1 and corresponding segment 2 along the flow passageway axis 23, that is, in a left and right direction as shown in the orientations of FIGS. 3D, 3E. Further, the guide 14 can restrict the lateral movement of the gate 1 and the corresponding segment 2. Thus, the guide 14 can perform several functions, including: centralizing the rocker arm 15 and the guide show 34 in the guide slot 28 during opening between seats 3; collapsing the gate assembly 22 when opening; allowing and controlling expansion of the gate assembly 22 when closing the gate valve; restricting the axial movement of the gate assembly 22 along the axis 23; restricting the lateral movement from side to side of the gate assembly in the valve body, retaining seats 3 in position when the valve is in an open position; and stiffening the guide 14 to assist in performing one or more of the prior functions.

Figure 5A:
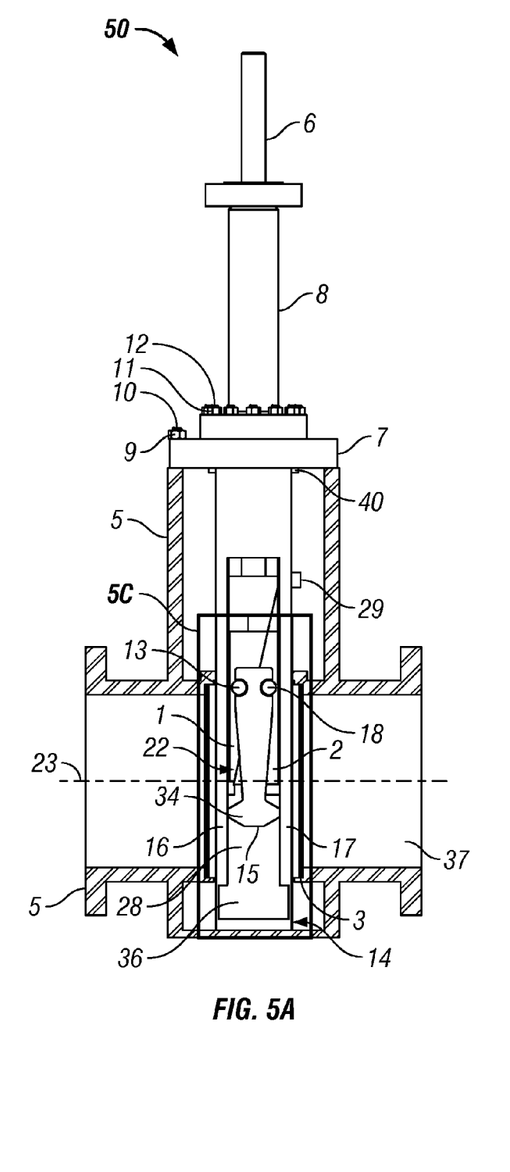
FIG. 5A is a side view, partial cross-sectional schematic of the exemplary embodiment of the non-ported gate valve of FIG. 3A in a partially closed position.
Figure 5B:
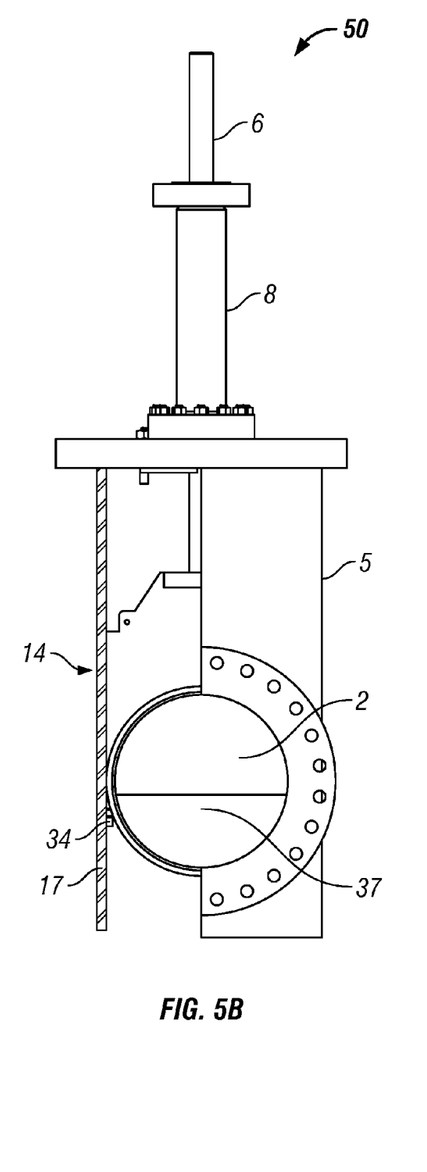
FIG. 5B is an end view, partial cross-sectional schematic of the exemplary embodiment of FIG. 5A.
Figure 5C:
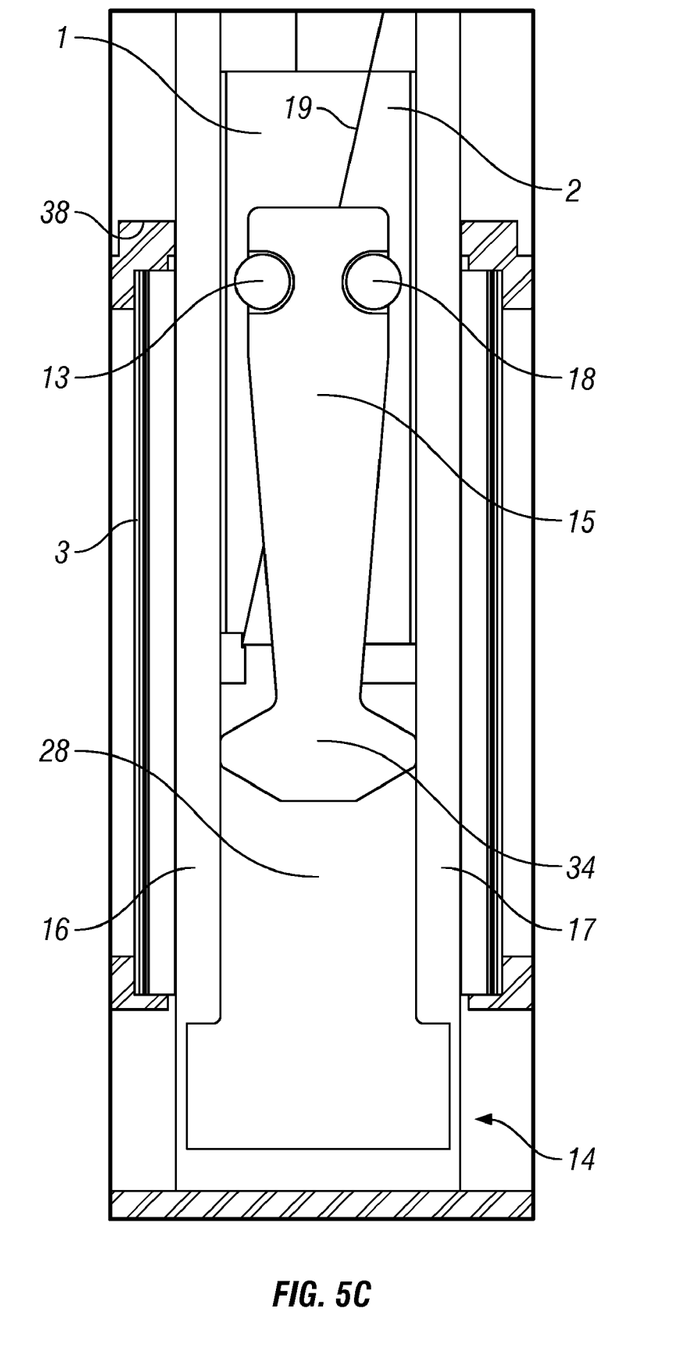
FIG. 5C is a detailed side view schematic of the expanding gate assembly slidably disposed in the guide in the valve in the partially closed position.

FIG. 5A is a side view, partial cross-sectional schematic of the exemplary embodiment of the non-ported gate valve of FIG. 3A in a partially closed position. FIG. 5B is an end view, partial cross-sectional schematic of the exemplary embodiment of FIG. 5A. FIG. 5C is a detailed side view schematic of the expanding gate assembly slidably disposed in the guide in the valve in the partially closed position. The figures will be described in conjunction with each other. The gate assembly 22 is shown in a partially closed position across the flow passageway of the valve cavity 37. As shown in FIG. 5B, the segment 2 is partially across the valve cavity 37. The gate stop 29 is lowered from the bonnet stop 40. Further, if the stem is a "rising" stem, then the stem 6 is shown correspondingly lowered in conjunction with the gate assembly 22. The rocker arm 15 is still positioned within the slot 28 and particularly the guide shoe 34 is still restrained from axially movement along the axis 23 by the sides 16, 17 of the guide 14. Thus, the relative position between the gate 1 and the segment 2 at the interface 19 can be unchanged from the positions shown in FIGS. 3A-3E above. Therefore, the components can still maintain the clearance 21 shown in FIG. 3E.

Figure 6A:
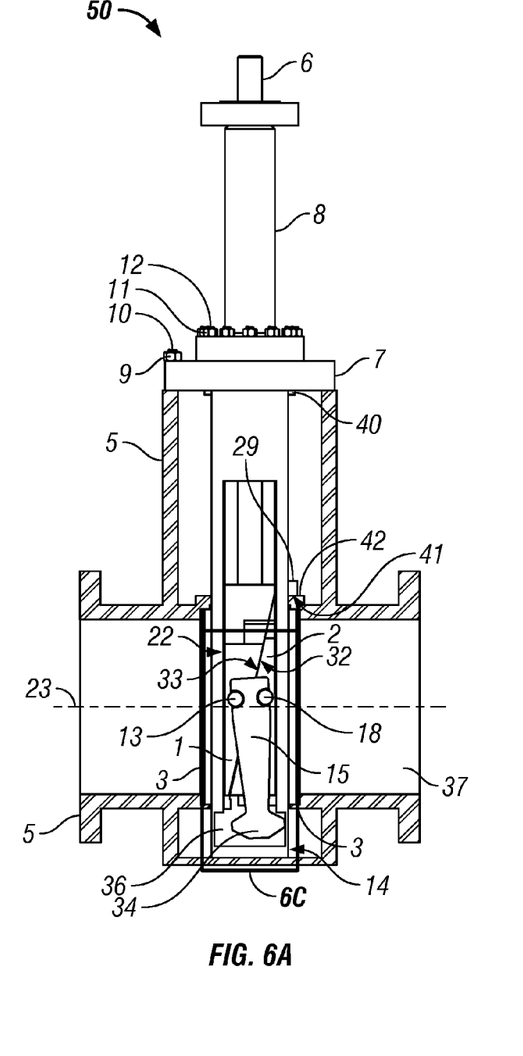
FIG. 6A is a side view, partial cross-sectional schematic of the exemplary embodiment of the non-ported gate valve of FIGS. 3A, 5A in a closed position.
Figure 6B:
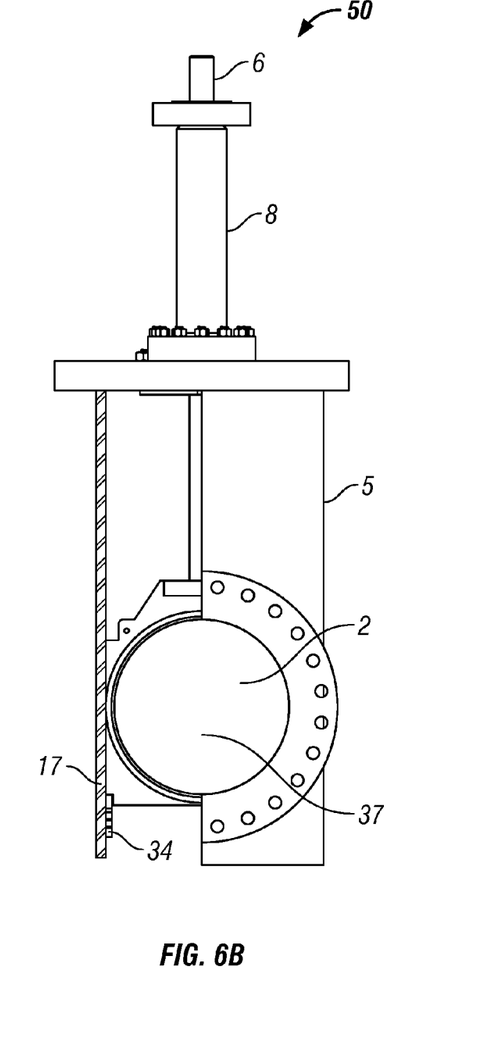
FIG. 6B is an end view, partial cross-sectional schematic of the exemplary valve of FIG. 6A.
Figure 6C:
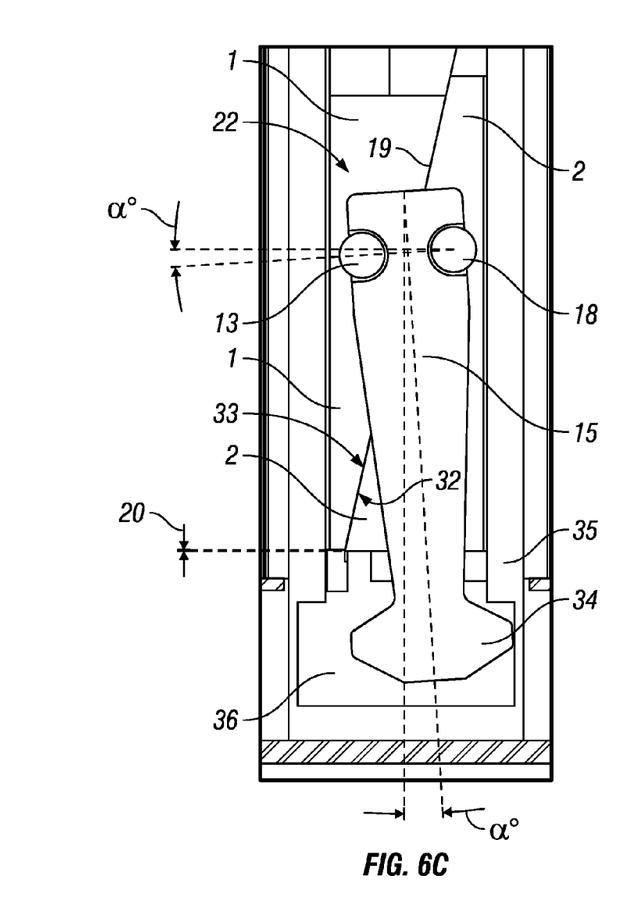
FIG. 6C is a detailed side view schematic of the expanding gate assembly slidably disposed in the guide in the valve in the closed position.
Figure 6D:
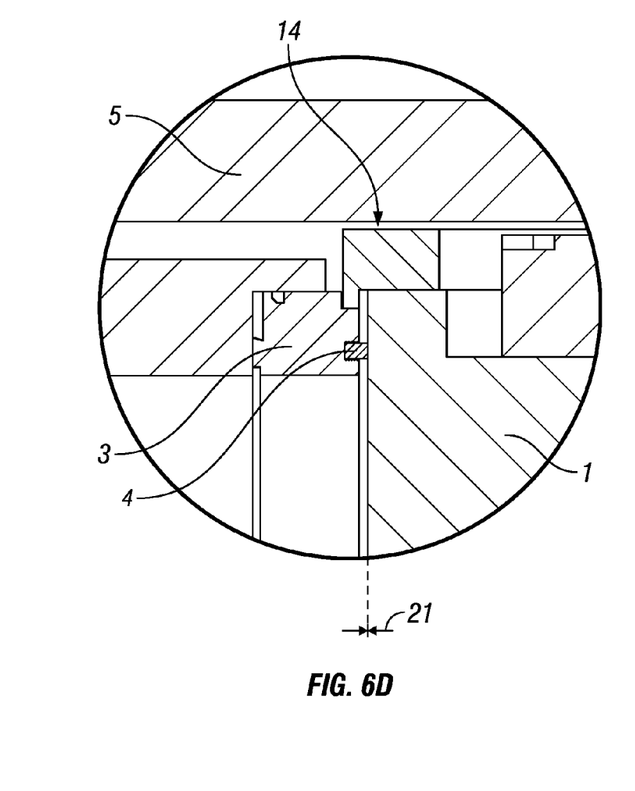
FIG. 6D is a detailed top view schematic of the expanding gate assembly relative to the guide in the valve and in sealing contact with the seat insert of the seat disposed in the valve.

FIG. 6A is a side view, partial cross-sectional schematic of the exemplary embodiment of the non-ported gate valve of FIGS. 3A, 5A in a closed position. FIG. 6B is an end view, partial cross-sectional schematic of the exemplary valve of FIG. 6A. FIG. 6C is a detailed side view schematic of the expanding gate assembly slidably disposed in the guide in the valve in the closed position. FIG. 6D is a detailed top view schematic of the expanding gate assembly relative to the guide in the valve and in sealing contact with the seat insert of the seat disposed in the valve. The figures will be described in conjunction with each other. The valve 50 is shown in a closed position with the gate assembly 22 shown across the valve cavity 37 and the corresponding flow passageway. As the gate assembly 22 is lowered, the rocker arm 14 and particularly the guide shoe 34 encounter the opened guide slot 36 of the guide 14 and allow the guide shoe the ability to pivot relative to one or more of the pins 13, 18. As the gate assembly lowers, the gate stop 29 and particularly a lower surface 41 of the stop 29 encounter the body stop 42. Upon contacting the body stop 42, further movement of the segment 2 of the gate assembly 22 is restricted.

However, the gate 1 can continue to move downward. Continued downward motion of gate 1 causes a wedging action between the gate surface 32 and the segment surface 33 along the interface 19 to expand the gate 1 and the segment 2 and form a tight seal against the seats 3. Thus, the relative position between the gate 1 and the segment 2 changes along the interface 19, so that the gate surface 32 slides relative to the segment surface 33 at the interface. The relative positions change the interface offset 20. In the illustrated embodiment, the interface offset 20 shown in FIG. 6C is different than the interface 20 shown in FIG. 3C. The relative dimensions are only exemplary, and depends in part on the starting point of the relative surfaces and the amount of expansion needed for sealing of the gate assembly to the seats. As the gate 1 slides along the interface 19 relative to the segment 2, the pin 13 shifts in position relative to the pin 18. The maximum amount of movement between the gate 1 and segment 2 is restricted by the amount of angle "a" determined by the width of the opened guide slot 36 in which the guide shoe 34 can move. Thus, when the gate 1 slides relative to the segment 2 along the interface 19, the gate assembly 22 expands in thickness. The dimensions are sized so that expanded thickness allows the gate 1 and corresponding segment 2 to contact their respective seat inserts 4 coupled to their respective seats 3 to seal the gate assembly across the valve cavity 37.

Other and further embodiments utilizing one or more aspects of the inventions described above can be devised without departing from the spirit of the disclosed invention. Further, the various methods and embodiments of the system can be included in combination with each other to produce variations of the disclosed methods and embodiments. Discussion of singular elements can include plural elements and vice-versa. References to at least one item followed by a reference to the item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalent of the following claims.

What is claimed is:

1. An expanding non-ported gate valve, comprising:
   a valve body having a valve cavity forming a flow passageway with a flow passageway axis;
   a non-ported gate assembly coupled to the valve body traverse to the flow passageway, the gate assembly adapted to expand in thickness in a closed position to seal the valve relative to a thickness of the gate assembly in an at least partially open position, the gate assembly comprising:
   a non-ported gate;
   a segment slidably coupled to the gate; and
   a rocker arm pivotally coupled to the gate and the segment;
   a pair of slotted guides fixedly positioned on the valve body, the guides each having a first side coupled to a second side and separated from the second side by a guide slot and an opened guide slot and mounted in axial alignment from the first side to the second side along a direction of the flow passageway axis and disposed laterally to the gate assembly, the slotted guides being slidably coupled with the gate assembly and adapted to guide the gate assembly as the gate assembly traverses across the flow passageway as the valve closes and opens, each guide comprising:
   the guide slot having a first width;
   the opened guide slot having a second width greater than the first width, the opened guide slot being formed in the guide at a position that corresponds with a position of the gate assembly in a closed position across the flow passageway; and
   wherein movement of the rocker arm in a direction along the flow passageway axis in the guide slot and the opened guide slot controls the thickness of the gate assembly.

2. The valve of claim 1, wherein the rocker arm comprises a guide shoe adapted to move within the guide slot as the gate assembly transverses across the flow passageway of the valve cavity and tilt at an angle when the guide shoe is disposed in the opened guide slot of the guide.

3. The valve of claim 2, wherein the gate and segment are adapted to move relative to each other when the guide shoe is disposed in the opened guide slot to change a thickness of the gate assembly.

4. The valve of claim 1, wherein the guide further comprises a side flange extending toward the flow passageway axis and at an angle to the guide slot and adapted to restrain the gate assembly in an axial direction along the axis.

5. The valve of claim 1, further comprising a seat disposed in a seat pocket in the valve body wherein the gate assembly is adapted to expand in thickness to engage the seat when the valve is in a closed position and collapse in thickness to disengage the seat when the valve is in an at least partially open position.

6. The valve of claim 5, wherein the guide further comprises a side flange extending toward the flow passageway axis and at an angle to the guide slot and adapted to restrain the seat in the seat pocket.

7. The valve of claim 1, wherein the second width of opened guide slot width is wider than the first width in an upstream direction and a downstream direction along the flow passageway axis.

8. The valve of claim 1, wherein the guide is adapted to restrain the gate assembly in a lateral direction from side to side movement in the valve body with one or more guide flanges extending laterally from the guides toward the flow passageway axis.

9. A method of closing and opening an expanding gate valve having a valve body with a valve cavity that forms a flow passageway with a flow passageway axis, and having an expanding gate assembly coupled to the valve body traverse to the flow passageway, the gate assembly having a gate, a segment slidably coupled to the gate, and a rocker arm being pivotally coupled to the gate and the segment, the valve further having a pair of slotted guides fixedly positioned with the valve body, each slotted guide having a first side coupled to a second side and separated from the second side by a guide slot and an opened guide slot, the guide being mounted in axial alignment from the first side to the second side along a direction of the flow passageway axis and disposed laterally to the gate assembly, the guide slot having a first width and the opened guide slot having a second width greater than the first width, the method comprising:

when the valve is in at least a partially open condition, moving the gate assembly with the rocker arm transversely into the valve cavity while the rocker arm moves along the fixedly-positioned laterally disposed guide slots that are mounted in axial alignment with the flow passageway axis so that a relative position between the gate and segment is maintained;

moving the gate assembly so that the rocker arm engages the opened guide slots;

stopping the segment from further transverse movement;

continuing to move the gate transversely across the valve cavity to close the valve; and changing a relative position between the gate and the segment and a position of the rocker arm in the opened guide slots along the flow passageway axis to allow a thickness of the gate assembly to expand into sealing contact with a seat disposed in the valve.

10. The method of claim 9, wherein opening the expanding gate valve comprises:

moving the gate assembly so that the rocker arm disengages the opened guide slots and begins to engage the guide slots;

changing the relative position between the gate and the segment to cause a thickness of the gate assembly to contract from the sealing contact with the seat; and moving the gate assembly transversely away from the flow passageway axis while the rocker arm slides in the guide slot.

11. The method of claim 9, further comprising restraining an axial movement of the gate assembly along the flow passageway axis with one or more guide flanges.

12. The method of claim 9, further comprising restraining the gate assembly in a lateral direction from side to side movement in the valve body with one or more guide flanges extending laterally from the guides toward the flow passageway axis.

13. The method of claim 9, wherein the gate valve comprises a seat disposed in a seat pocket in the valve body to interface with the gate assembly, and further comprising restraining an axial movement of the seat along the flow passageway axis with one or more side flanges extending from the guides toward the flow passageway axis and at an angle to the guide slots.

* * * * *